US006952660B1

(12) United States Patent
Matheson (10) Patent No.: US 6,952,660 B1
(45) Date of Patent: Oct. 4, 2005

(54) COLLABORATION SESSION RECORDING MODEL

(75) Inventor: Dan Matheson, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 865 days.

(21) Appl. No.: 09/680,750

(22) Filed: Oct. 6, 2000

(51) Int. Cl.[7] .............................................. G06F 17/50
(52) U.S. Cl. ...................... 703/1; 707/100; 707/101; 707/102; 707/103 R; 707/103 Y; 707/103; 707/103 Z; 707/104.1; 709/204
(58) Field of Search ........................... 703/1; 707/100, 707/101, 102, 103 R, 103 Y, 103, 103 Z, 707/104.1; 705/8; 709/204

(56) References Cited

U.S. PATENT DOCUMENTS

| | | | | |
|---|---|---|---|---|
| 5,867,654 A | * | 2/1999 | Ludwig et al. | ............. 709/204 |
| 5,917,480 A | * | 6/1999 | Tafoya et al. | ............... 345/732 |
| 6,105,055 A | | 8/2000 | Pizano, et al. | |
| 6,212,530 B1 | * | 4/2001 | Kadlec | ........................ 707/201 |
| 2002/0032592 A1 | * | 3/2002 | Krasnick et al. | ............... 705/8 |

FOREIGN PATENT DOCUMENTS

| | | |
|---|---|---|
| GB | 2247549 | 3/1992 |
| WO | WO 99/56206 | 11/1999 |

* cited by examiner

Primary Examiner—Anthony Knight
Assistant Examiner—Thomas Pham (57) ABSTRACT

A decision tracking object model and interface which captures and stores administrative and substantive meeting information, along with their associated relationships, in an object model database is presented. Each object model includes information and relationships that are accessible via a publicly defined interface.

13 Claims, 6 Drawing Sheets

COLLABORATION SESSION RECORDING MODEL

FIELD OF THE INVENTION

The present invention pertains generally to information management, and more particularly to a system and method for capturing, storing, and tracking meeting-related information of an online collaboration session.

BACKGROUND OF THE INVENTION

Product development is assisted by computer based applications, including word processing and graphics tools, scheduling tools, and product data management tools, among others. The typical product development cycle begins with an idea for a product or an improvement to a product that addresses a need in the industry or provides a solution to a problem. From the product idea, alternative designs may be explored, and ultimately, a design is chosen, designed, and implemented. During the initial phases of the product development cycle, word processing, graphics, and scheduling tools are often used to capture information such as marketing analyses, projected development schedules, and descriptions and reasonings behind particular design choices. During the design phase, information related to the design, such as the design specifications and 3-D model data, are typically captured using a CAD tool. During production of the product, part-tracking information is typically captured using a Product Data Management (PDM) tool. During every phase of the product development cycle, issues and decisions are made.

Collaboration tools have been developed to assist the product development process and encourage better communication by allowing people to conduct meetings online from remote locations. These collaboration tools provide some means for allowing simultaneous viewing of the same data and at least one method for communication (e.g., graphical pointers, graphical markups, audible communication (e.g., internet telephone), chat programs that are based on text, etc.).

While it is clear that various computer-based tools assist in capturing information and tracking the progress of a product and assisting inter-peer/group/entity communication, the current state of the art could be improved. First, no collaboration tool currently exists for specifically capturing and tracking idea questions, answers, and decisions associated with all phases of the product development cycle. Exploration of ideas is often a situation where many questions and issues are presented, and resulting answers or solutions are presented, and often ultimately resulting in decisions. In order to successfully track such exploration, it is necessary to capture many only partially completed information structures, including questions raised, proposals for solutions, answers to the questions, decisions made, including the decisions to continue or abandon a path of exploration, and the rationale behind these decisions. In the prior art, no single tool exists for capturing and tracking such information. Furthermore, no collaboration tool is specifically tuned to the capture of product design information. Finally, even if some of the information is captured using one or more different tools, because the information is not integrated into one application or easily accessible except using the particular tool that captured the information, much of the information relating to the design choices and decision rationales, as well as the issues and proposals that were explored during the development of the product, is typically not effectively captured, and may even become lost as the development cycle of the product progresses.

Many reasons exist why it would be advantageous to have the ability to access the data created by one tool using different tools. In particular, the information captured using one tool may be useful to various people from various entities performing various roles. For example, certain information captured during the design of a product may be useful not only to the design engineers, but to the manufacturing and testing engineers, managers of the product generation process, service technicians, marketing and sales personnel, order processing personnel, web site designers and administrators, customers, and suppliers, to name a few.

Accordingly, a need exists for a way to capture, store, and track product design issues and decision information including questions posed and answers on which decisions are or are not based and the rationale behind the decisions. A need also exists for the ability to capture such information from within a collaboration session to allow for realtime development of ideas, issues, and solutions by multiple remote meeting participants. In addition, a need exists for capturing this information in a tool neutral form that allows any tool to access (and modify where appropriate) the captured information.

SUMMARY OF THE INVENTION

The present invention is a system and method for capturing, storing, and tracking product design information developed during an online meeting in a tool neutral persistent form. The invention also captures and tracks the information related to the details of a meeting, including clerical information such as time, location, participants, agenda, and schedule.

The present invention preferably includes a Collaboration object model which captures information relating to an online meeting, including separate Meeting Plan objects, Meeting Agenda objects, Meeting Objective objects, Meeting Schedule objects, Meeting Discussion objects, Conversation objects, Actor objects, Action Item objects, and Commitment objects. The relationships between the various objects are also captured.

The Collaboration object model preferably interfaces with an Innovation Information Management object model to capture design development specific information and a Decision Tracking object model to capture decision-related information.

The invention also facilitates sophisticated queries on the object models to extract interesting information from the totality of stored information. The invention is advantageous for many reasons, including the ability for multiple people with different roles to access and extract the information in ways that are meaningful to their role.

BRIEF DESCRIPTION OF THE DRAWINGS

The invention will be better understood from a reading of the following detailed description taken in conjunction with the drawing in which like reference designators are used to designate like elements, and in which.

DETAILED DESCRIPTION

Figure 1:
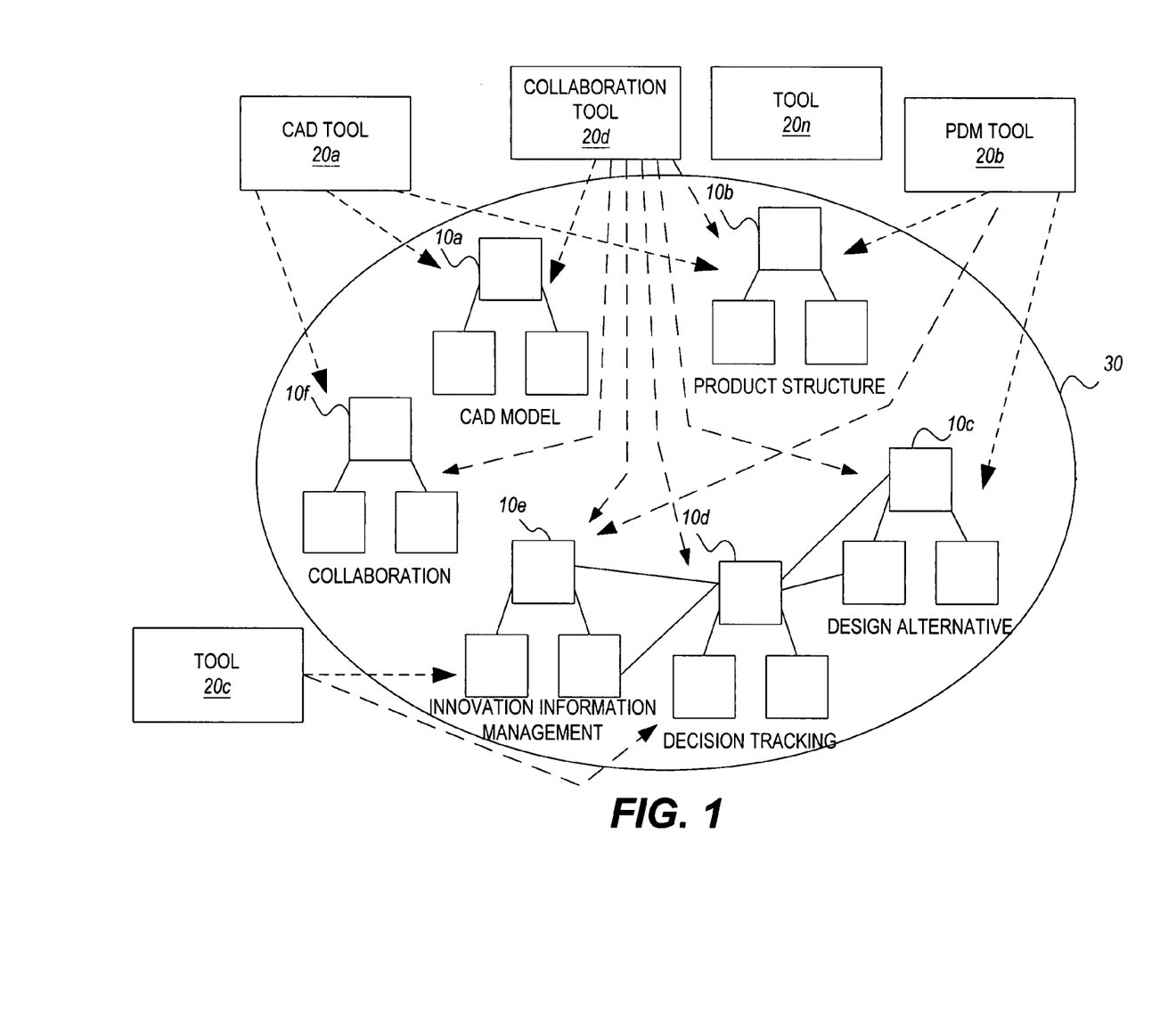
FIG. 1 is a conceptual object model diagram illustrating the separation of articles of information and their associated relationships to other articles of information.

FIG. 1 is a conceptual block diagram illustrating the separation of articles of information and their associated relationships to other articles of information, illustrating the accessibility of the information by various tools. In particular, a collection of object models 10a, 10b, 10c, 10d, 10e, 10f describing information and object relationships created by a variety of different tools 20a, 20b, 20c, 20d . . . . 20n during the development of a product are stored in a tool neutral form in persistent storage 30. Importantly, the object models 10a, 10b, 10c, 10d, 10e, 10f are not owned by any tool, including the tools 20a, 20b, 20c, 20d . . . , 20n that created them. Each object model 10a, 10b, 10c, 10d, 10e, 10f contains objects that have highly dependent object relationships.

The object models 10a, 10b, 10c, 10d, 10e, 10f each have a defined public interface that allows any tool 20a, 20b, 20c, 20d, . . . , 20n that understands the interface definition to read and write legal data to the corresponding set of objects. Although it may be that only one application tool completely understands a single attribute (for example, a CAD tool that understands a 3D geometry and topology), the public interface definition allows virtually any tool to access parts of the object that is does understand, including its relationships with other objects. For example, the CAD tool 20a (e.g., SolidDesigner) creates data that is stored partly in the CAD Model object model 10a and partly in the Product Structure object model 10b. It is important to note that the CAD tool 20a is not required to change its internal data structure or user interface; rather the CAD tool 20a need only have capability to understand only those objects and structure that it reads and writes (which may be accomplished using an extension that allows import/export capability, techniques of which are well-known in the art). In this example, a collaboration tool 20d (e.g., CoCreate Software, Inc.'s OneSpace) accesses the collaboration object model 10f, the CAD data object model 10a and Design Alternative model 10c. Accordingly, the PDM tool 20b must have capability for handling changes made to the Product Structure model 10b made by the CAD tool 20a, and likewise, the CAD tool 20a must have the capability of handling changes made to the Product Structure model 10b by the PDM tool 20b. The common object model (i.e., Product Structure model 10b) that they understand thereby enhances the collaboration between the CAD tool 20a and PDM tool 20b.

It is also important to note that other tools (e.g., 20n) can also access the object models 10a, 10b, 10c, 10d, 10e, 10f at any time, and the collection of object models 10a, 10b, 10c, 10d, 10e, 10f, can be expanded at any time. Accordingly, the collection of information and relationships with other objects expands and evolves over the course of the product cycle, capturing the "as-designed" aspects of the product. In addition, the tool neutral persistent form of the object models allow both synchronous and asynchronous collaboration of the product development by allowing many different people (e.g., engineers, management, administrative personnel, and even customers) with appropriate permissions to access the data contained in the object models, which represents the current state of the product.

Among the object models in the object model database 30 is a Collaboration Session object model 10f, which encapsulates the information associated with a collaboration session meeting, including the meeting plan, meeting agenda, meeting objective, meeting schedule, meeting participants, conversation of the meeting participants, action items, and commitments. The Collaboration Session object model 10f also captures the relationships between each of the different types of the above-mentioned information.

Objects in the Collaboration Session object model 10f may be created automatically by one or more tools 20a, 20b, 20c, 20d, . . . 20n, or may be specifically created by users via specific meeting capture dialogs accessed via the user interface of the tools. In one embodiment, a collaboration tool 20d captures the collaboration session meeting data. However, as noted above, no tool has ownership of the data in any object model 10a, 10b, 10c, 10d, 10e, 10f, and any tool can access any of the objects via publicly defined interfaces (discussed hereinafter).

Figure 2:
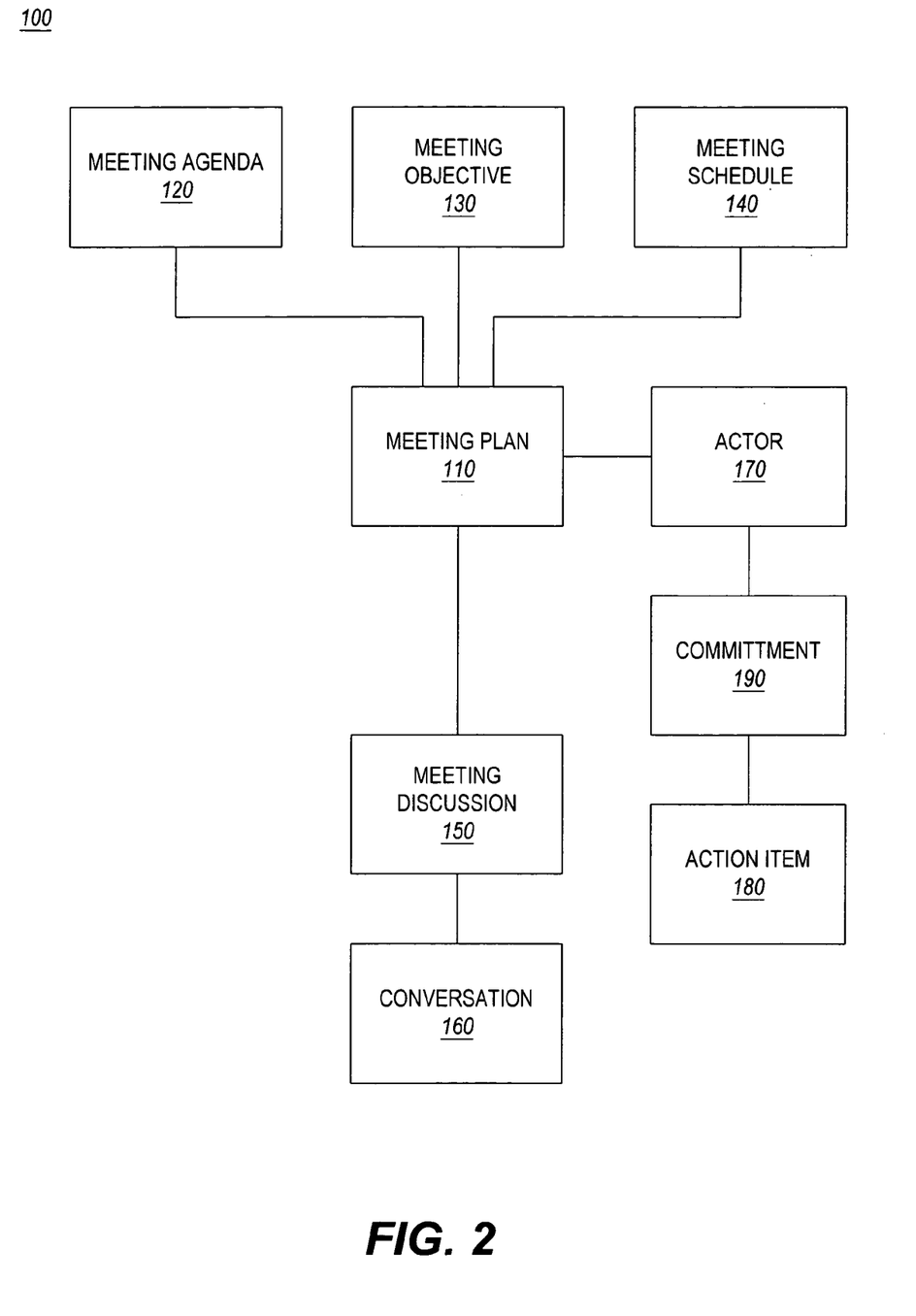
FIG. 2 is a block diagram of a Collaboration object model implemented in accordance with the invention.

FIG. 2 is a block diagram illustrating a preferred embodiment 100 of the Collaboration Session object model 10f of FIG. 1, which provides an object model for capturing and storing the pieces of information relating to an online meeting in a tool neutral persistent form.

As illustrated in FIG. 2, the major articles of information in the Collaboration Session object model 100 include the objects: Meeting Plan object 110, Meeting Agenda object 120, Meeting Objective object 130, Meeting Schedule object 140, Meeting Discussion object 150, Conversation object 160, Actor object 170, Action Item object 180, and Commitment object 190. These objects together with a publicly defined interface for creating and accessing them model the environment necessary to set up, conduct, and follow up on a synchronous collaboration session.

A Meeting Plan object 110 encapsulates the need to have a meeting. The meeting can be physical or online. A Meeting Agenda object 120 encapsulates an agenda plan of the meeting. A Meeting Objective object 130 encapsulates the objectives of the meeting. A Meeting Schedule object 140 encapsulates a schedule for the meeting. A Meeting Discussion object 150 encapsulates an instance of a meeting session. A meeting may take place over several sessions.

A Conversation object 160 encapsulates the exchange between meeting participants during a meeting.

An Actor object 170 represents a person participating in the meeting. An Action Item object 180 encapsulates a single task or piece of work to be done. A Commitment object 190 encapsulates a commitment by an Actor do something. Several Action Item objects 180 could be associated with a Commitment object 190.

Within the Collaboration Session object model 100, there exist relationships between the different objects, as illustrated by the connecting lines between the objects. For example, each Meeting Plan object 110 may have associated with it several Meeting Discussion objects 150 (which would be the case, for example, when the collaboration session is conducted over several different time segments) and each Meeting Discussion object may have many conversation objects 160 which capture the conversation which took place during the particular meeting segment represented by its associated Meeting Discussion. A single Meeting Plan object may have several Meeting Objective objects associated with it, each representing a different objective.

Figure 3:
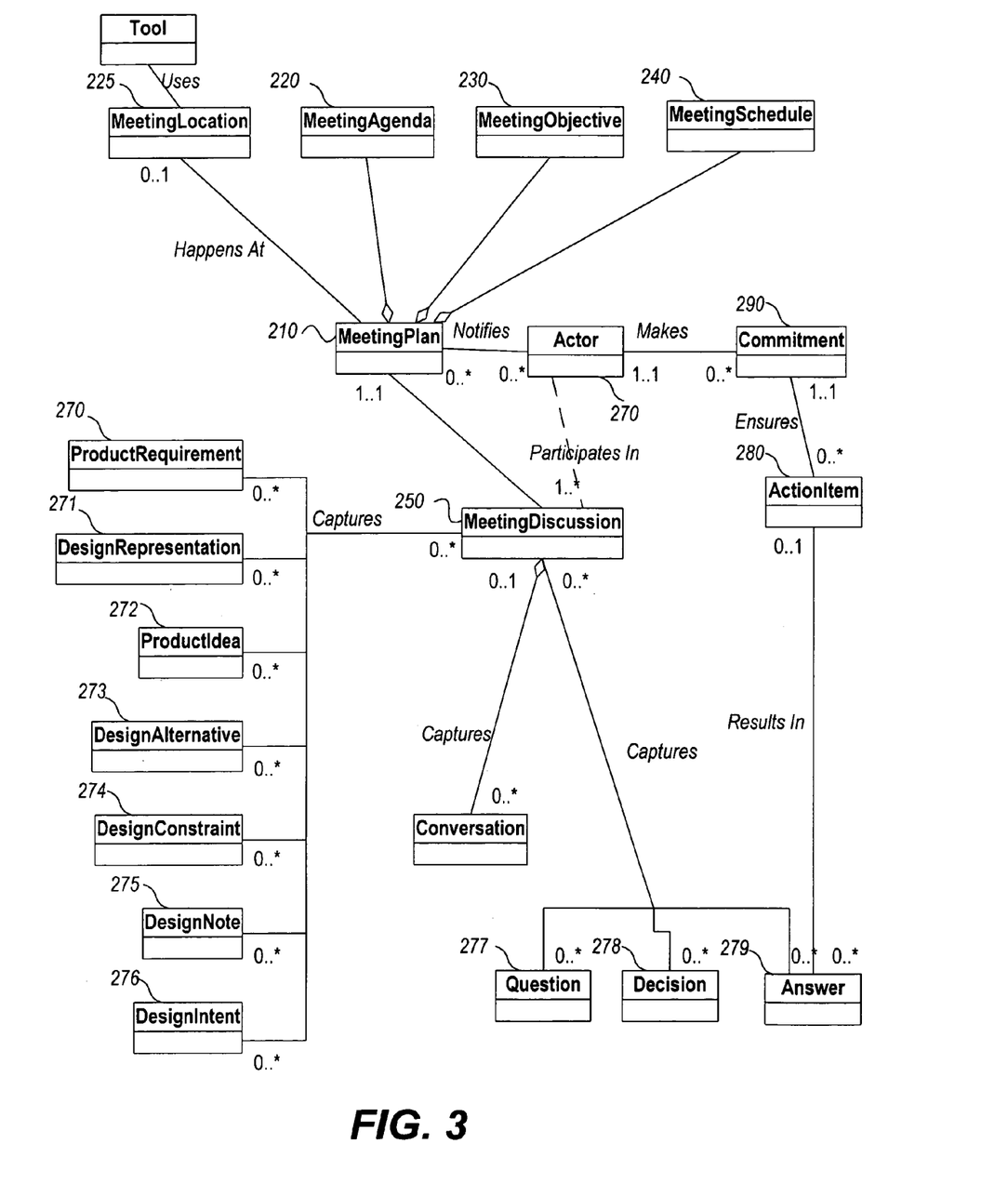
FIG. 3 is a UML interface diagram illustrating a preferred embodiment of the Collaboration object model interface for the Collaboration object model shown in FIG. 2.

FIG. 3 is a UML interface diagram illustrating a preferred embodiment of the Collaboration Session object model interface for the Collaboration Session object model 100 of FIG. 2. As illustrated in FIG. 3, the public interfaces defined for the Collaboration Session object model 200 of FIG. 2 include: MeetingPlan 210, MeetingAgenda 220, MeetingObjective 230, MeetingSchedule 240, MeetingDiscussion 250, Conversation 260, Actor 270, ActionItem 280, and Commitment 290.

The Collaboration Session interface definition models the environment necessary to set up, conduct, and follow up on a synchronous collaboration session.

When a meeting is first planned, the need to have the meeting is captured via the MeetingPlan 210 interface and encapsulated in a Meeting Plan object 110 (FIG. 2). Administrative information related to the meeting, such as the time (or schedule), location, purpose (or objective), agenda, and participants may be set up via the respective interfaces including MeetingSchedule 240, MeetingLocation 225, MeetingObjective 230, MeetingAgenda 220, and Actor 270. Typically, the meeting will be set up at one time using the MeetingPlan interface 210, which notifies each Actor of the meeting and relevant information associated with the meeting plan, and the actual meeting discussion will take place at another scheduled time. The Collaboration Session object model captures the initial set up information in separate information objects (e.g., Meeting Plan object 110, Meeting Agenda 120, Meeting Objective 130, and Meeting Schedule 140) via the appropriate interfaces in FIG. 3, which is then stored in persistent storage in a tool neutral form and later associated with Meeting Discussion objects 150 which encapsulate product design development objects.

Figure 4:
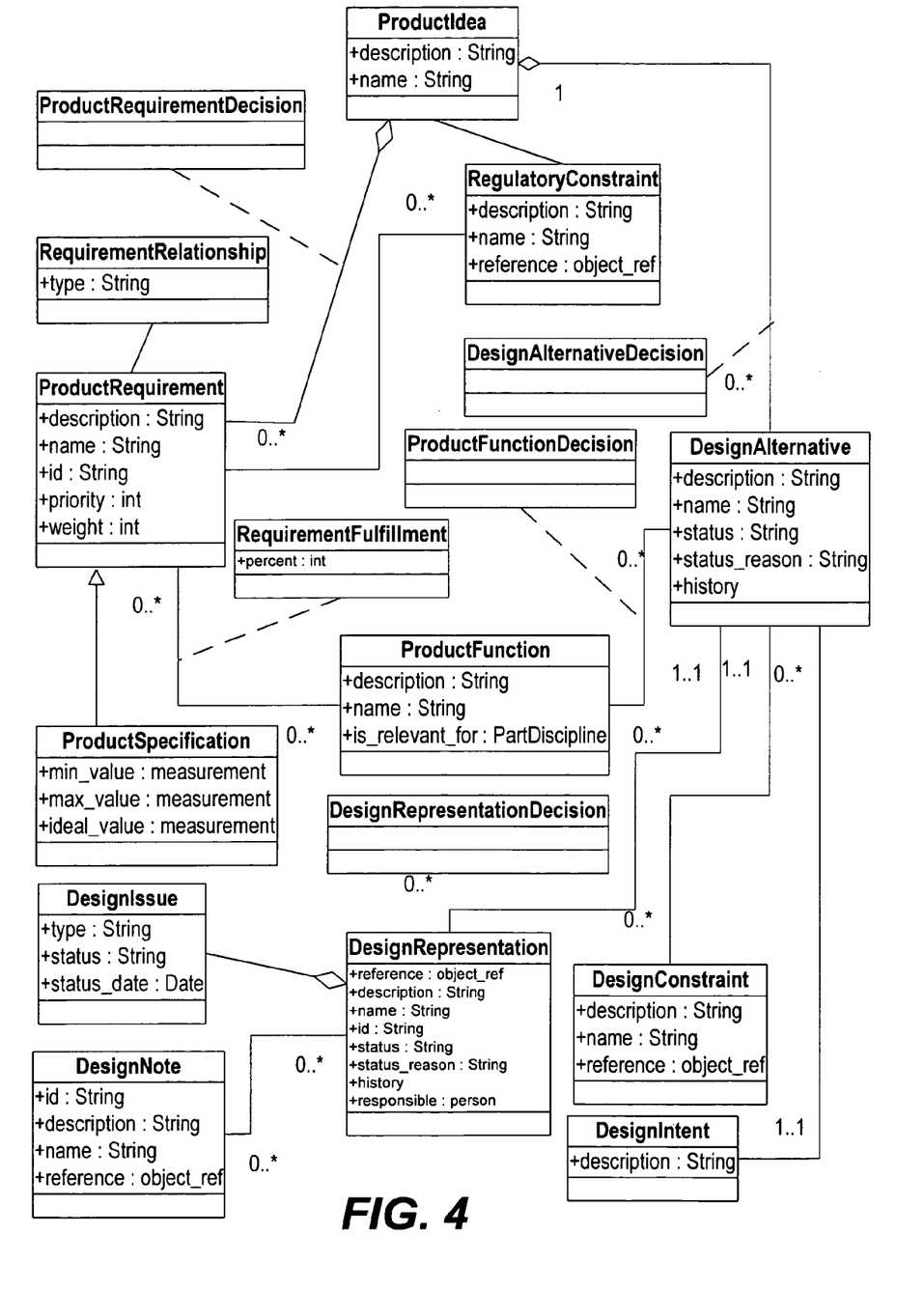
FIG. 4 is a UML interface diagram illustrating a preferred embodiment of the Innovation Information Management object model interface.

In particular, a MeetingDiscussion interface 250 provides an interface for capturing product requirements, design representations, product ideas, design alternatives, design constraints, design notes, design intents, and questions, decisions, and answers relating to any of the design issues presented. The methods by which the product design development information is captured is via the respective interfaces ProductRequirement 270, Design Representation 271, ProductIdea 272, DesignAlternative 273, DesignConstraint 274, DesignNote 275, DesignIntent 276, Question 277, Decision 278, and Answer 279. These interfaces are the portal into the Innovation Information Management (IIM) object model 10e (FIG. 1), which models the information developed during the exploration of solutions to a product idea, and the Decision Tracking object model 10d (FIG. 1) which models the information used in the process of making design decisions. FIG. 4 is a UML diagram of the IIM object model 10e used in the illustrative embodiment of the invention, which is described in more detail in copending application Ser. No. 09/680,751, entitled "Innovation Information Management Model" of the same inventor, and is incorporated by reference herein for all that it teaches. In particular, respective interfaces ProductRequirement 270, Design Representation 271, ProductIdea 272, DesignAlternative 273, DesignConstraint 274, DesignNote 275, DesignIntent 276 encapsulate design information in separate objects, including Product Idea objects, Design Alternative objects, Design Constraint objects, Design Note objects, and Design Intent objects.

In accordance with IMM object model 10e, a Product Idea object encapsulates an idea about a product. A Product Idea object may be an idea for a new product, an enhancement or improvement to an existing product, or the solution to a known problem (such as an Engineering Change) for an existing product. A Product requirement object encapsulates a requirement that the product must or should or could fulfill. For any given product, there will typically be many requirements from many different sources (e.g., marketing, customers, engineering, manufacturing). RequirementFulfillment objects encapsulate information related to levels of fulfillment of requirements by design alternatives and their related functions. A Design Alternative object encapsulates information representing a possible solution or design for an idea encapsulated in a Product Idea object. A Design Representation object encapsulates one way of modeling the proposed solution or design represented in a Design Alternative object. A Design Intent object encapsulates a note related to the design. A Design Issue object is associated with a Design Representation. The issue encapsulated in a Design Issue object represents a concern or open question raised after viewing the representation of the Design Alternative. A Design Constraint object encapsulates a constraint, of which the organization has some control over, that the Design Alternative must meet.

Figure 5:
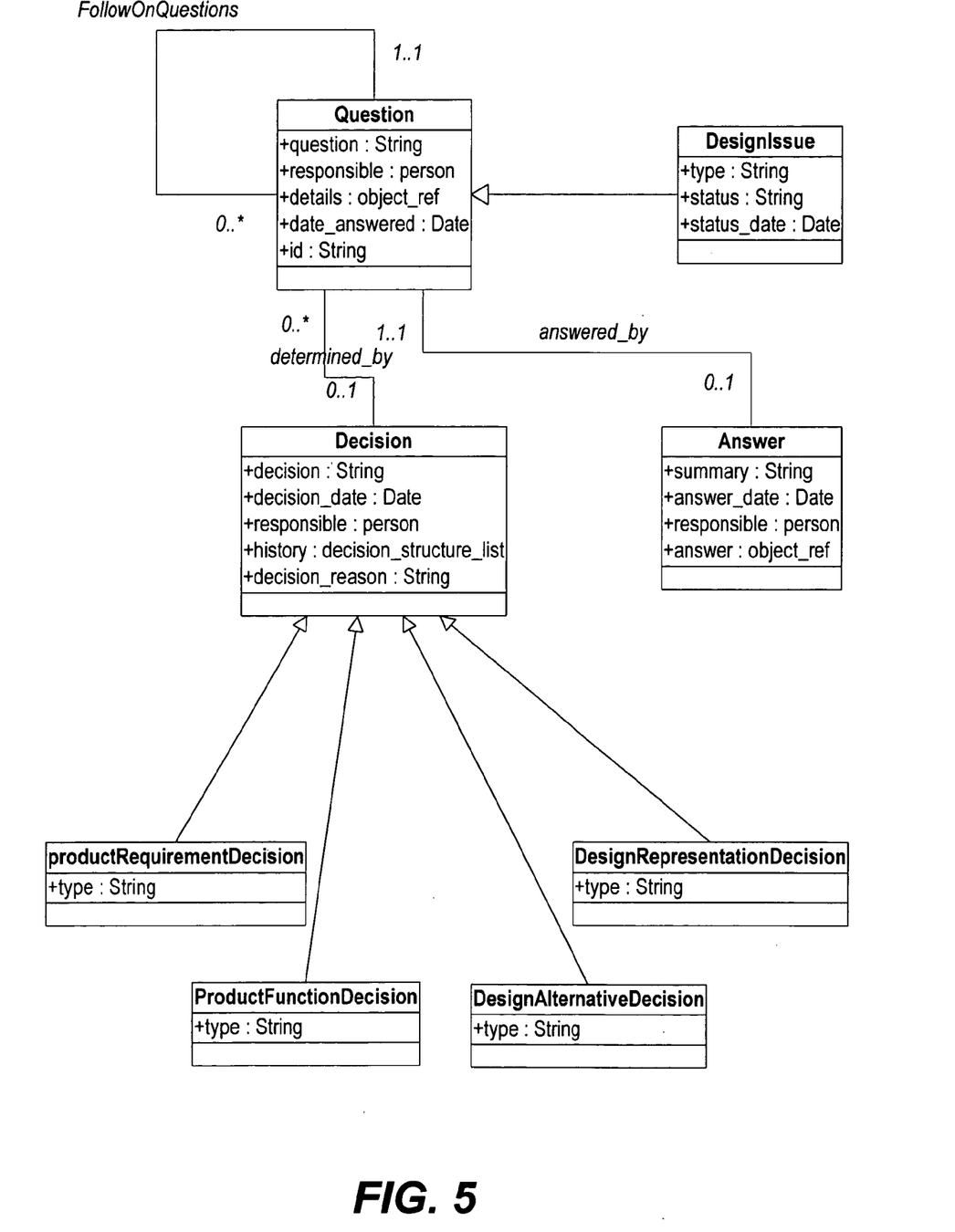
FIG. 5 is a UML interface diagram illustrating a preferred embodiment of the Decision Tracking object model interface.

FIG. 5 is a UML diagram of the Decision Tracking object model 10d (FIG. 1) used in the present invention which models the information used in the process of making design decisions, and is described in more detail in copending application Ser. No. 09/680,604, entitled "Object Model For Decision And Issue Tracking" of the same inventor, and is incorporated by reference herein for all that it teaches. In particular, respective interfaces Question 277, Decision 178, and Answer 279 encapsulate design information in separate objects; including Question objects, Decision objects, and Answer objects.

In accordance with the Decision Tracking object model 10d, a Decision object encapsulates a design decision about an aspect of a product. Various types of Decisions may be defined that are specific to a particular design aspect. A Question object encapsulates a question which may or may not be relevant to the formation of a design decision that is encapsulated by a Decision object. An Answer object encapsulates an answer to a question encapsulated in a Question object.

The interface into the IIM object model 10e and Decision Tracking object model 10d from the Collaboration Session object model 10f allows all of the design development information discussed during an online meeting to be captured, modified, and accessed by all participants in the meeting. Furthermore, it allows all of the meeting information, including the design development information captured in that meeting to be accessed and built upon at a later time using any other application. For example, a CAD engineer with a commitment to change a portion of the design in a particular manner may not recall the particular design intent of the change, which was discussed in an online meeting. Using a CAD tool 10a which uses the public interfaces for the appropriate object models that encapsulate the Collaboration Session object model 10f and IIM object model 10e, the engineer can query the object models to retrieve the design intent associated with the design change action item.

The interfaces defined in the UML diagrams of FIGS. 3, 4 and 5 are preferably implemented in an object-oriented language such as C++ or Java2. The actual class implementation may vary from system to system, since it will often make sense to combine some of the interfaces into a single class for efficiency of implementation and/or performance.

Figure 6:
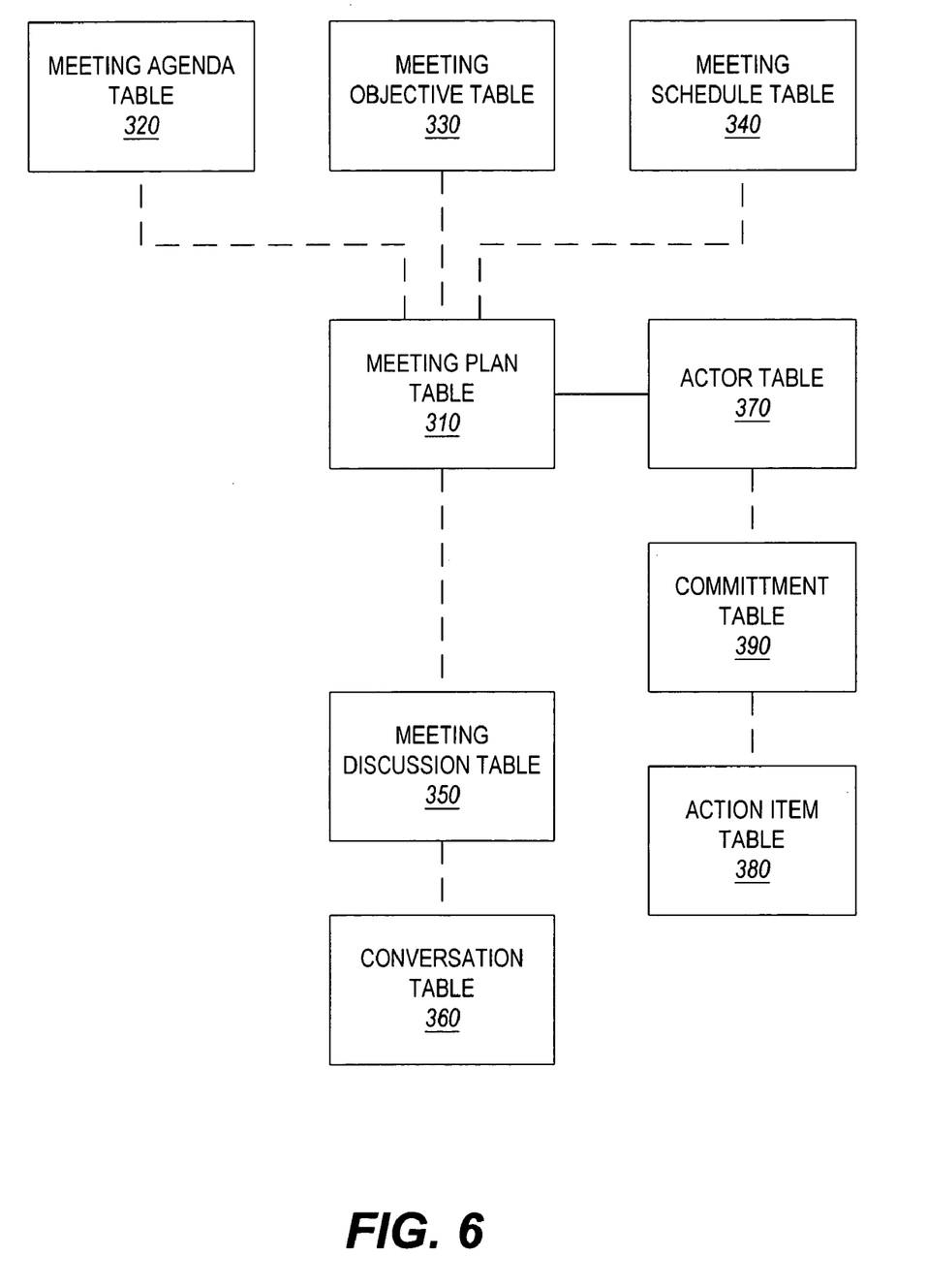
FIG. 6 is a block diagram of the persistent storage entities generated and maintained by the Decision Tracking object model of FIG. 2 using the interfaces defined in FIG. 3.

FIG. 6 is a block diagram illustrating one embodiment of the persistent storage entities generated and maintained by the Collaboration Session object model 100 of FIG. 2 using the interfaces defined in FIG. 3. In this embodiment, each of the interfaces has associated with it a persistent storage file, preferably in the form of a relational database. The data encapsulated using each respective interface is stored in its respective relational database file. Accordingly, there is a separate relational database file for each defined interface. In the illustrative embodiment, a Meeting Plan table 310 stores all data accessed using the MeetingPlan interface 210, Meeting Agenda table 320 stores all data accessed using the Meeting Agenda interface 220, Meeting Objective table 330 stores all data accessed using the MeetingObjective interface 230, Meeting Schedule table 340 stores all data accessed using the MeetingSchedule interface 240, Meeting Discussion table 350 stores all data accessed using the Meeting Discussion interface 250, Conversation table 360 stores all data accessed using the Conversation interface 260, Actor table 370 stores all data accessed using the Actor interface 270, Commitment table 390 stores all data accessed using the Commitment interface 290, and Action Item table 380 stores all data accessed using the Action Item interface 280. The dashed lines connecting the various tables represents a foreign key (i.e., a common column in each connected relational database) used to represent relationships between data stored in the tables.

In the preferred embodiment, each table is implemented using a separate relational database file, where each row maps to a different object of the type stored in that particular relational database file, and each column maps to an attribute encapsulated using the particular associated interface or to a primary key used to uniquely identify an particular object within the file or to a foreign key used to associate an object in one file with an object in one of the other relational database files.

Meeting information may be captured via user interface dialogs and/or automatically without user intervention. For example, the meeting plan and associated objective and participants may be entered manually by a user via a dialog, while the schedule and location of the meeting may be determined by an automatic scheduler application and then captured in the Collaboration Session object model. Similar dialogs may be implemented to capture design-specific issues, product requirement decisions, product function decisions, design alternative decisions, and design representation decision.

As described in detail above, the invention provides a novel way of capturing, storing, accessing, and tracking questions, answers, issues, and decisions. The Decision Tracking object model of the invention allows the capture of the incremental build-up of decision exploration data including questions, answers, and decisions relating to product issues, alternative design proposals, product requirements, and product functions that are explored during the development of a product. The decision tracking information is represented in a form that may be accessed and presented in different ways using various computer-based applications.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A computer system for managing information related to development of a product, comprising:
    a product requirement interface for capturing information related to requirements that said product should fulfill in product requirement objects;
    a meeting plan interface for capturing administrative meeting information in meeting plan objects;
    a meeting discussion interface for capturing substantive information pertaining to the contents of discussion during meetings in meeting discussion objects, wherein said meeting discussion interface creates (i) action item objects encapsulating information defining tasks, associated with design of said product, to be completed and (ii) commitment objects encapsulating information identifying individuals responsible to complete tasks defined in action item objects;
    a design alternative interface for capturing information related to multiple designs associated with said product in design alternative objects; and
    a requirement fulfillment interface for processing queries related to levels of fulfillment of requirements encapsulated in product requirement objects by respective designs encapsulated in said design alternative objects.

2. The computer system of claim 1, wherein:
meeting plan objects and meeting discussion objects are stored in a tool-neutral persistent form.

3. The computer system of claim 1, wherein
meeting plan objects and meeting discussion objects are stored in separate relational databases, wherein associations between meeting plan objects and meeting discussion objects are captured using foreign keys.

4. The computer system of claim 1, wherein:
said meeting discussion interface captures decision related information in decision objects.

5. The computer system of claim 1, wherein:
said meeting plan interface provides the ability to capture a meeting agenda in a meeting agenda object, a meeting objective in a meeting objective object, a meeting schedule in a meeting schedule object, wherein said meeting agenda object, said meeting objective object, and said meeting schedule object are stored separately in a tool-neutral form.

6. A method for managing information related to development of a product, comprising:
    capturing information related to requirements that said product should fulfill in product requirement objects;
    capturing administrative meeting information in meeting plan objects;
    capturing substantive information pertaining to the contents of discussion during meetings in meeting discussion objects;
    capturing action items defining tasks to be performed during development of said product in action item objects and commitments by meeting participants to perform said action items in commitment objects;
    capturing information related to multiple designs associated with said product in design alternative objects; and
    processing queries related to levels of fulfillment of requirements encapsulated in product requirement objects by respective designs encapsulated in said design alternative objects.

7. The method of claim 6 further comprising:
storing commitment objects and action item objects separately in a form accessible by multiple software applications through a common public interface.

8. The method of claim 6 further comprising:
storing meeting plan objects and meeting discussion objects in a tool-neutral persistent form.

9. The method of claim 6 further comprising:
storing meeting plan objects and meeting discussion objects in separate relational databases, wherein associations between meeting plan objects and meeting discussion objects are captured using foreign keys.

10. The method of claim 6 further comprising:
capturing decision related information in decision objects.

11. The method in claim 6 further comprising:
capturing a meeting agenda in a meeting agenda object, a meeting objective in a meeting objective object, a meeting schedule in a meeting schedule object; and
storing said meeting agenda object, said meeting objective object, and said meeting schedule object separately in a tool-neutral form.

12. A computer readable storage medium, tangibly embodying program instructions for managing information related to development of a product, comprising:
code for capturing information related to requirements that said product should fulfill in product requirement objects;
code for capturing administrative meeting information in meeting plan objects;
code for capturing substantive information pertaining to the contents of discussion during meetings in meeting discussion objects;
code for capturing action items defining tasks to be performed during development of said product in action item objects and commitments by meeting participants to perform said action items in commitment objects;
code for capturing information related to multiple designs associated with said product in design alternative objects; and
code for processing queries related to levels of fulfillment of requirements encapsulated in product requirement objects by respective designs encapsulated in said design alternative objects.

13. The computer readable storage medium of claim 12 further comprising:
code for capturing decision related information in decision objects.

* * * * *